United States Patent [19]

Dromigny

[11] Patent Number: 4,759,538
[45] Date of Patent: Jul. 26, 1988

[54] DEVICE FOR TRANSPORTING A FILM OF DETERMINED FORMAT

[76] Inventor: Pierre Dromigny, 54 avenue de Versailles, 75016 Paris, France

[21] Appl. No.: 885,687

[22] Filed: Jul. 15, 1986

[30] Foreign Application Priority Data

Mar. 24, 1986 [FR] France ................. 86 04182

[51] Int. Cl.⁴ .................. B29C 49/24; B65H 3/08
[52] U.S. Cl. ................... 271/31.1; 271/129; 425/125
[58] Field of Search ........... 271/129, 31.1, 9, 107; 425/125

[56] References Cited

U.S. PATENT DOCUMENTS

| | | | |
|---|---|---|---|
| 4,355,967 | 10/1982 | Hellmer | 271/107 X |
| 4,479,770 | 10/1984 | Slat | 271/9 X |
| 4,549,863 | 10/1985 | Bourgeois | 271/107 X |
| 4,710,116 | 12/1987 | Dromigny | 425/125 |

Primary Examiner—Richard A. Schacher
Attorney, Agent, or Firm—Fisher, Christen & Sabol

[57] ABSTRACT

This invention relates to a device for transporting a film of determined format from a position where a film is taken from a magazine to a work position between two parts, mobile with respect to each other in a first direction, of a machine. The device includes apparatus for taking a film from said magazine capable of moving, in a movement asociated with that of said parts, in a second direction at right angles to said first direction between said position of taking and said work position, and drive apparatus are associated with said magazine to animate the latter, independently of said parts but in synchronism therewith, by a reciprocating movement parallel to said first direction.

4 Claims, 1 Drawing Sheet

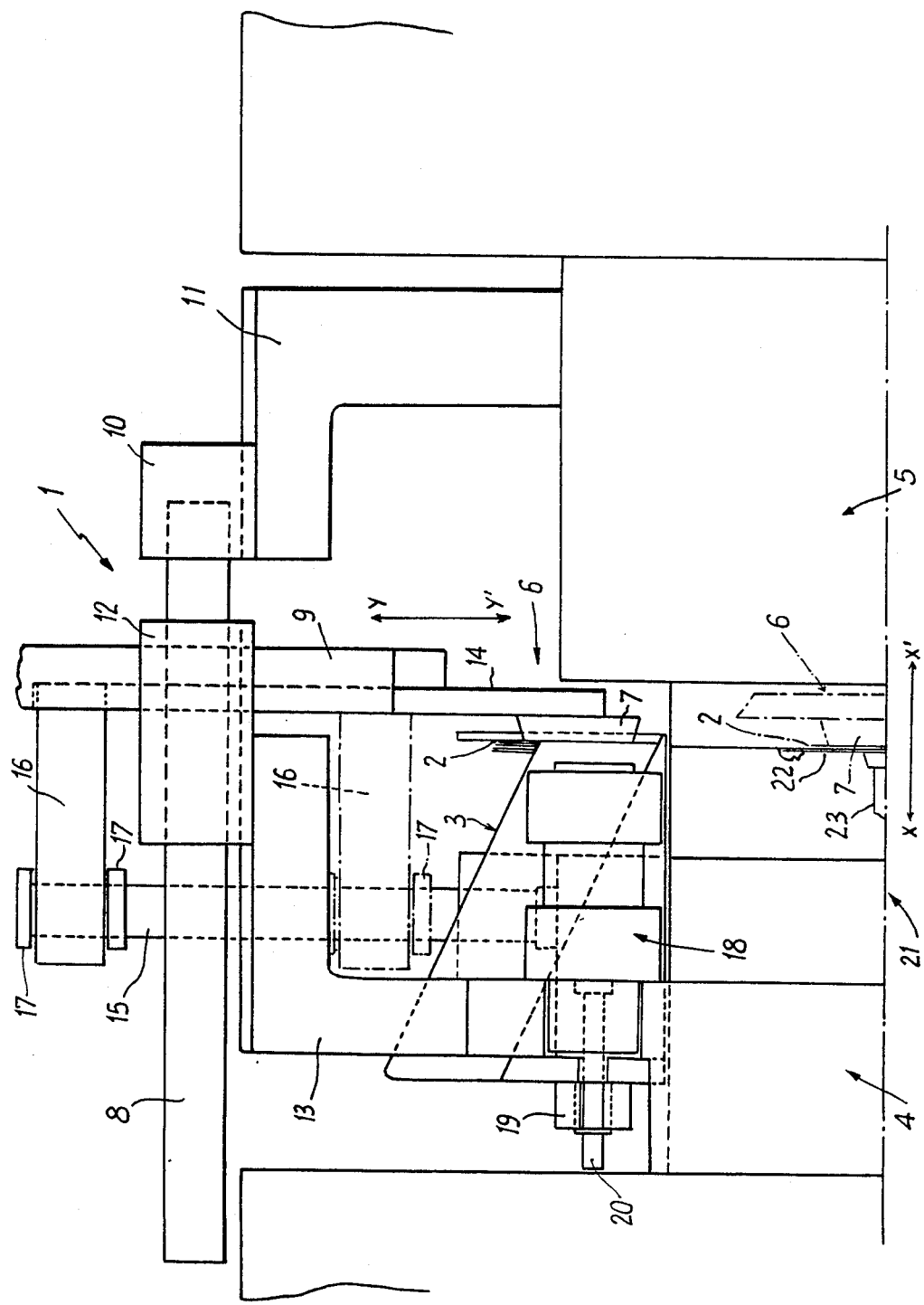

DEVICE FOR TRANSPORTING A FILM OF DETERMINED FORMAT

The present invention relates to a device for transporting a film of determined format, intended for example to coat, at least partially, a moulded object, from a position where a film is taken from a magazine containing a plurality of films to a work position between two parts, mobile with respect to each other in a first direction, of a machine, such as for example a mould.

Different devices used for the purpose indicated above are already known. Such devices generally comprise means for taking a film from the magazine, particularly by partial vacuum, and for guiding it between the two parts, mobile with respect to each other, of the machine. However, in such known devices, said film-taking means must effect relatively complex movements, independently of said parts but in synchronism therewith, either for taking the film or for conducting it into work position. In addition, said means may take more than one film at a time, this obviously increasing production costs and in addition being detrimental to correct operation of the machine.

It is an object of the present invention to overcome these drawbacks and it relates to a device for transporting a film which takes the film and transfers it to a work position in simple manner, whilst ensuring skimming of the films contained in the magazine.

To that end, the transporting device is noteworthy, according to the invention, in that it comprises means for taking a film from said magazine capable of moving, in a movement associated with that of said parts, in a second direction at right angles to said first direction between said position of taking and said work position, and in that drive means are associated with said magazine to animate the latter, independently of said parts but in synchronism therewith, by a reciprocating movement parallel to said first direction, so as to conduct the end film contained in said magazine in contact with said film-taking means and, thanks also to the reciprocating movement of the magazine, to skim said films.

According to another feature of the invention, the film-taking means are driven by a system of two crossed racks meshed one with the other, of which one, parallel to said first direction, is fast with a first part of said machine and the other, parallel to said second direction and which may slide in a guide fast with the second part of the machine, is fast with said film-taking means.

The film-taking means advantageously comprise at least one nozzle creating a partial vacuum.

Moreover, it is advantageous if the drive means of the magazine, mounted on a mobile support, comprise at least one jack, and if the film-taking means are associated with means for displacing them in the first direction so as to deposit the film exactly at the bottom of the cavity of the mould.

The invention will be more readily understood on reading the following description with reference to the accompanying drawings, in which:

The single FIGURE schematically shows a film-transporting device according to the invention, associated with a mould.

Referring now to the drawings, the device 1 according to the invention is intended for transporting a film 2 of determined format, serving, in this embodiment, to coat at least partially a moulded object (it may, for example, be a label on the lid of a recipient), from a position in which the film is taken from a magazine 3 containing a plurality of films 2, to a work position between two parts 4, 5, mobile with respect to each other in a first direction X—X', of the mould 21. Part 4 may for example be considered as mobile, whilst part 5 is fixed.

Device 1 comprises means 6 for taking a film 2 from the magazine 3, capable of moving, in a movement associated with that of parts 4, 5, in a second direction Y—Y' at right angles to the first direction X—X' between the film-taking position and the work position. It will be noted that, in the drawing, the film-taking means are partially shown in chain-dotted lines in said work position, the mould in that case being open, whilst, in the film-taking position proper, shown in solid lines, the mould is closed.

More precisely, the film-taking means 6, comprising at least one nozzle 7 creating a partial vacuum, are driven by a system of crossed racks 8, 9 meshed one with the other, of which one, 8, parallel to the first direction X—X', is fast, via a support 10 and a sole 11, with a first part 5 of the mould, and of which the other, 9, parallel to the second direction Y—Y' and which may slide, as well as rack 8, in a guide 12 fast, via a sole 13, with the second part 4 of the mould, is fast, via a support 14, with nozzle 7.

Support 14 is connected to two guiding columns (only one column 15 being visible in the drawing), each via a crosspiece 16 of which the free end is traversed by the corresponding column 15.

Ball-bearing bushes 17, mounted on corresponding column 15, are provided on either side of crosspiece 16.

The crosspiece 16/bush 17 assembly may slide along column 15 in a direction parallel to direction Y—Y' between a position (in solid lines) corresponding to said film-taking position and a position (in broken lines) corresponding to said work position.

Moreover, drive means such as a jack 18, are associated with the magazine 3, mounted on a mobile support 19, to animate the latter, independently of parts 4, 5 but in synchronism therewith, in a reciprocating movement parallel to the first direction X—X'. This reciprocating movement of magazine 3 makes it possible to conduct the end film 2 contained in the magazine in contact with the partial-vacuum nozzle 7 and also to skim the films contained in the magazine. Two guiding columns parallel to direction X—X' (only one column 20 being visible in the drawing) are also provided.

A jack or the like (not shown) may be provided to displace, along axis X—X', the partial-vacuum nozzle 7 so as to deposit the film 2 exactly at the bottom of cavity 22 of the mould. Nozzle 7 then releases the film which is taken up by nozzle 23 which maintains said film at the bottom of the cavity of the mould.

Thanks to the device of the invention, a film of determined format, and only one, may thus be taken from the magazine and conducted into work position, in synchronism with the opening and closure of the mould.

What is claimed is:

1. Device for transporting a film of determined format from a position where a film is taken from a magazine containing a plurality of films to a work position between two parts, mobile with respect to each other in a first direction, of a machine, said device comprising:
   means for taking a film from said magazine which is capable of moving, in a movement associated with that of said parts mobile with respect to each other, in a second direction at a right angle to said first direction between said position of taking said film from a magazine and said work position between said parts mobile with respect to each other, and which are driven by a system of two crossed racks meshed one with the other, of which one, parallel to said first direction, is solid with a first part of said two parts mobile with respect to each other of said machine and the other, parallel to said second direction and which may slide in a guide solid with the second part of said two parts mobile with respect to each other of the machine, is solid with said film-taking means; and drive means associated with said magazine to animate the latter, independently of said two parts mobile with respect to each other but in synchronism therewith, by a reciprocating movement parallel to said first direction, so as to contact with said film-taking means.

2. The device of claim 1 wherein the film-taking means comprise at least one nozzle creating a partial vacuum.

3. The device of claim 1 wherein the drive means of the magazine, mounted on a mobile support, comprises at least one actuator.

4. The device of claim 1 wherein the film-taking means are associated with means for displacing them in the first direction.

* * * * *